(12) United States Patent
Osaka et al.

(10) Patent No.: US 6,972,157 B2
(45) Date of Patent: Dec. 6, 2005

(54) MAGNETIC RECORDING MEDIUM, PRODUCTION PROCESS THEREOF, AND MAGNETIC RECORDING AND REPRODUCING APPARATUS

(75) Inventors: Tetsuya Osaka, Tokyo (JP); Hiroshi Sakai, Chiba (JP)

(73) Assignees: Waseda University, Tokyo (JP); Showa Denko Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/396,483

(22) Filed: Mar. 26, 2003

(65) Prior Publication Data

US 2003/0219627 A1    Nov. 27, 2003

Related U.S. Application Data

(60) Provisional application No. 60/368,129, filed on Mar. 29, 2002.

(30) Foreign Application Priority Data

Mar. 26, 2002   (JP) .............................. 2002-086451

(51) Int. Cl.[7] .......................... B32B 5/66; B32B 5/70; C23C 14/34
(52) U.S. Cl. .................... 428/828; 428/900; 204/192.2
(58) Field of Search ................... 428/694 TS, 694 TM, 428/900, 336, 611, 667; 427/128, 130, 131; 204/192.2

(56) References Cited

U.S. PATENT DOCUMENTS

5,660,930 A      8/1997   Bertero et al. .............. 428/332
6,475,611 B1 *  11/2002   Chen .......................... 428/213

FOREIGN PATENT DOCUMENTS

JP       08-030951       2/1996

OTHER PUBLICATIONS

Kikitsu et al., "Micromagnetic study of CoPt-SiO2 granular films by spin-wave Brillouin scattering", J. Appl. Phys., vol. 87, No. 9, May 2000, pp. 6944-6946.*

* cited by examiner

Primary Examiner—Holly Rickman
(74) Attorney, Agent, or Firm—Sughrue Mion, PLLC

(57) ABSTRACT

A magnetic recording medium comprises a substrate, an undercoat layer, a magnetic layer, and a protective film. The undercoat layer and the magnetic layer are provided atop the substrate. The magnetic layer contains a noble metal layer containing Pt or Pd, a cobalt layer containing Co, and a non-magnetic material layer containing C or Si or Ge.

19 Claims, 2 Drawing Sheets

MAGNETIC RECORDING MEDIUM, PRODUCTION PROCESS THEREOF, AND MAGNETIC RECORDING AND REPRODUCING APPARATUS

CROSS-REFERENCE TO RELATED APPLICATIONS

This application claims benefit of Provisional Application 60/368,129, filed Mar. 29, 2002, incorporated herein by reference, under 35 U.S.C. § 111(b) pursuant to 35 U.S.C. § 119(e) (1).

BACKGROUND OF THE INVENTION

1. Field of the Invention

The present invention relates to a magnetic recording medium which is employed in, for example, magnetic disk apparatuses, and more particularly to a magnetic recording medium exhibiting excellent noise characteristics.

2. Background Art

Most commercially available magnetic recording media are of a longitudinal recording type, in which easy-magnetization axes in a magnetic film are oriented generally horizontally with respect to a substrate.

In order to increase recording density of a longitudinal magnetic recording medium, magnetic grains must be reduced in size, to thereby lower noise. However, when the magnetic grains are reduced in size, the magnetic grains decrease in volume, and thus reproduction characteristics (read/write properties) of the medium tend to deteriorate as a result of thermal instability. In addition, when recording density is increased, in some cases the effect of a diamagnetic field at a recording bit boundary may cause an increase in medium noise.

In contrast, in a perpendicular magnetic recording medium in which easy-magnetization axes in a magnetic film are oriented generally perpendicular to a substrate, even when recording density is increased, the effect of a diamagnetic field is small at a recording bit boundary, and recording magnetic domains having clear boundaries are formed, thus enabling noise reduction.

Furthermore, in a perpendicular magnetic recording medium, even when magnetic grains are of relatively large volume, recording density can be increased, and thus thermal stability can be enhanced. Therefore, a perpendicular magnetic recording medium has recently become of interest.

For example, Japanese Patent Application Laid-Open (kokai) No. 60-214417 discloses a perpendicular magnetic recording medium including a perpendicular magnetic film formed of a Co alloy, and an undercoat film which is provided beneath the magnetic film and is formed of Ge or Si.

Japanese Patent Application Laid-Open (kokai) No. 63-211117 discloses a perpendicular magnetic recording medium including a perpendicular magnetic film formed of a Co alloy, and an undercoat film having a thickness of 1 Å to 100 Å (0.1 nm to 10 nm), which is provided beneath the magnetic film and formed of a carbon-containing material.

However, the aforementioned conventional magnetic recording media entail drawbacks in that difficulty is encountered in increasing squareness ratio, and nucleation field (Hn) is considerably lowered. Therefore, such a magnetic recording medium exhibits poor thermal stability at low recording density.

Squareness ratio is obtained by dividing residual magnetization by saturation magnetization.

In order to solve the aforementioned problems, Japanese Patent Application Laid-Open (kokai) No. 6-111403 or 8-30951 or U.S. Pat. No. 5,660,930 discloses a magnetic recording medium which enables Hn to be increased, the medium including a multi-layer film in which layers of a transition metal such as Co and layers of a noble metal such as Pt are laminated.

In recent years, demand has arisen for magnetic recording media of higher recording density, and in accordance with this trend, improvement of noise characteristics has been required.

However, the aforementioned conventional magnetic recording medium including a multi-layer film formed of layers of transition metal and noble metal exhibits unsatisfactory noise characteristics, and therefore, demand has arisen for magnetic recording media exhibiting further excellent noise characteristics.

SUMMARY OF THE INVENTION

In view of the foregoing, an object of the present invention is to provide a magnetic recording medium which enables squareness ratio and Hn to be increased, and which exhibits excellent noise characteristics.

Another object of the present invention is to provide a process for producing the medium.

Yet another object of the present invention is to provide a magnetic recording and reproducing apparatus including the medium.

In order to solve the aforementioned problems, the present inventors have performed extensive studies, to thereby accomplish the present invention. Accordingly, the present invention provides the following aspects.

[1] A magnetic recording medium comprising a substrate, an undercoat layer, a magnetic layer, and a protective film, the undercoat layer, the magnetic layer and the protective film being provided atop the substrate, wherein the magnetic layer contains a noble metal layer containing Pt or Pd, a cobalt layer containing Co, and a non-magnetic material layer containing C or Si or Ge.

[2] A magnetic recording medium according to [1], wherein the noble metal layer, the cobalt layer, and the non-magnetic material layer contained in the magnetic layer are each provided in a number of two or more.

[3] A magnetic recording medium according to [1] or [2], wherein the magnetic layer contains a plurality of multi-layer structures, each including the noble metal layer and the cobalt layer (32), and a non-magnetic material layer is provided between the multi-layer structures.

[4] A magnetic recording medium according to [3], wherein, in each of the multi-layer structures, the noble metal layer and the cobalt layer are laminated alternately, and the noble metal layer and the cobalt layer are each provided in a number of 2 to 30.

[5] A magnetic recording medium according to [3] or [4], wherein the number of the multi-layer structures which are separated by a non-magnetic material layer is 2 to 10.

[6] A magnetic recording medium according to any one of [1] through [5], wherein the magnetic layer is a perpendicular magnetic layer in which easy-magnetization axes are oriented generally perpendicular to the substrate.

[7] A magnetic recording medium according to any one of [1] through [6], wherein the non-magnetic material contains, as a primary component, at least one element selected from the group consisting of C, Si, and Ge.

[8] A magnetic recording medium according to any one of [1] through [7], wherein the non-magnetic material layer has a thickness of 0.1 nm to 10 nm.

[9] A magnetic recording medium according to any one of [1] through [8], wherein the noble metal layer has a thickness of 0.4 nm to 2 nm.

[10] A magnetic recording medium according to any one of [1] through [9], wherein the cobalt layer has a thickness of 0.1 nm to 1 nm.

[11] A magnetic recording medium according to any one of [1] through [10], wherein the noble metal layer contains an oxide or nitride of a metal or a non-metallic element.

[12] A magnetic recording medium according to any one of [1] through [11], wherein the cobalt layer contains an oxide or nitride of a metal or a non-metallic element.

[13] A magnetic recording medium according to [11] or [12], wherein the metal or the non-metallic element in the oxide or nitride is at least one element selected from the group consisting of Cr, Cu, Ag, Au, B, Al, Ga, Si, Ge, and Zr.

[14] A magnetic recording medium according to any one of [1] through [13], which has an Hn of 1,000 Oe to 4,500 Oe (79,000 A/m to 355,500 A/m).

[15] A magnetic recording medium according to any one of [1] through [14], wherein the undercoat layer contains at least one element selected from the group consisting of C, Si, and Ge.

[16] A magnetic recording medium according to any one of [1] through [15], wherein a soft magnetic layer containing a soft magnetic material is provided between the substrate and the undercoat layer,

[17] A process for producing a magnetic recording medium as recited in any one of [1] through [16], comprising successively forming the noble metal layer, the cobalt layer, and the non-magnetic material layer, which layers constitute the magnetic layer, within a single chamber of a sputtering apparatus, the chamber having a sputtering target containing Pt or Pd, a sputtering target containing Co, and a sputtering target containing C or Si or Ge.

[18] A magnetic recording medium produced through a production process as recited in [17].

[19] A magnetic recording and reproducing apparatus comprising a magnetic recording medium as recited in any one of [1] through [16] and [18].

DETAILED DESCRIPTION OF THE INVENTION

Figure 1:
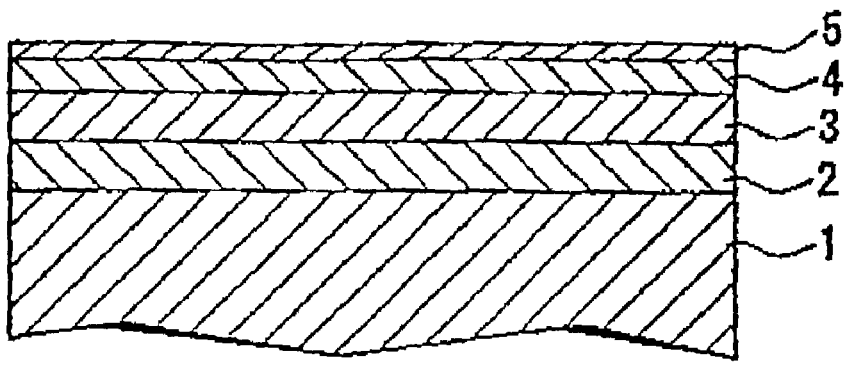
FIG. 1 is a partial cross-sectional view showing an embodiment of the magnetic recording medium of the present invention.

The magnetic recording medium of the present invention comprises a substrate (1), an undercoat layer (2), a magnetic layer (3), and a protective film (4), the layers (2) and (3) and the protective film (4) being provided atop the substrate (1). A characteristic feature of the medium resides in that the magnetic layer (3) contains a noble metal layer (31) containing Pt or Pd, a cobalt layer (32) containing Co, and a non-magnetic material layer (33) containing C or Si or Ge.

Preferably, each of the noble metal layer (31), the cobalt layer (32), and the non-magnetic material layer (33) contained in the magnetic layer (3) is provided in a number of two or more. More preferably, the magnetic layer (3) contains a plurality of multi-layer structures, each including the noble metal layer (31) and the cobalt layer (32), and the non-magnetic material layer (33) is provided between the multi-layer structures.

The magnetic recording medium of the present invention will next be described with reference to FIG. 1. The magnetic recording medium of the present invention has, for example, a structure including a substrate 1; an undercoat film 2 formed of, for example, carbon; a magnetic layer 3 of multi-layer structure; a protective film 4; and a lubrication film 5, the film 2, the layer 3, the film 4, and the film 5 being successively formed on the substrate 1.

The substrate 1 may be an aluminum alloy substrate on which NiP film is formed through plating (hereinafter referred to as an "NiP-plated Al substrate"), which is generally employed as a substrate for producing a magnetic recording medium. Alternatively, the substrate 1 may be a glass substrate, a ceramic substrate, a carbon substrate, a flexible resin substrate, or a substrate obtained by forming NiP film on such a non-metallic substrate through plating or sputtering.

The magnetic layer 3 is formed of a plurality of Pt- or Pd-containing layers, a plurality of Co-containing layers, and a plurality of non-magnetic-material-containing layers.

In the present invention, the Pt- or Pd-containing layer may be formed of an alloy of Pt and Pd. Preferably, the Pt- or Pd-containing layer contains Pt or Pd in an amount of at least 50 at %, The Co-containing layer may be formed of Co solely, or may contain Co and another element such as Cr, Ta, or C. In the latter case, the Co-containing layer preferably contains Co in an amount of at least 50 at %.

Figure 2:
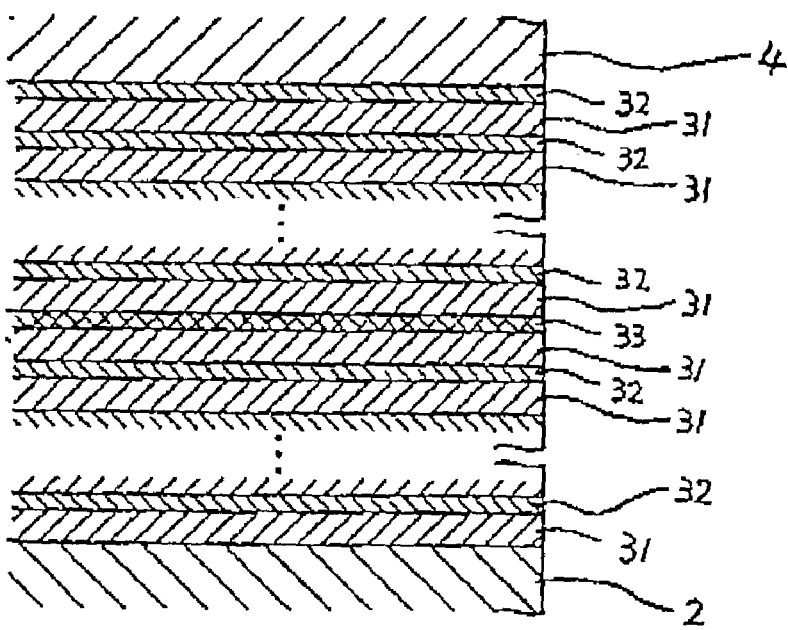
FIG. 2 is a partial cross-sectional view showing another embodiment of the magnetic recording medium of the present invention.

In the present invention, as shown in FIG. 2, preferably, the magnetic layer contains a plurality of multi-layer structures, each including the noble metal layer 31 and the cobalt layer 32, and the non-magnetic material layer 33 is provided between the multi-layer structures, When the magnetic layer has such a structure, squareness ratio and Hn of the magnetic recording medium can be increased, and noise characteristics can be improved.

In the present invention, in each of the multi-layer structures, the noble metal layer 31 and the cobalt layer 32 are laminated alternately, and preferably the noble metal layer 31 and the cobalt layer 32 are each provided in a number of 2 to 30, more preferably 5 to 20. When the number of each of the layers 31 and 32 exceeds 30, the thickness of the multi-layer structure is increased, and thus resolution is lowered.

When the noble metal layer 31 or the cobalt layer 32 has a small thickness, even if these layers are formed alternately through, for example, sputtering, in some cases, the resultant layers may be observed as macroscopically intermingled, and structural analysis reveals that the layers are mixed together. In the present invention, the expression "the multi-layer structure" encompasses such a film in which these layers are macroscopically mixed. This is because, even in such a film, microscopically, a multi-layer structure is formed by the noble metal layer 31 and the cobalt layer 32, and effects of the present invention arc obtained.

In the present invention, the number of the multi-layer structures, each including the noble metal layer 31 and the cobalt layer 32, is preferably 2 to 10, more preferably 2 to 5, and the nonmagnetic material 33 is preferably provided between the multi-layer structures. When the number of the multi-layer structures exceeds 10, coercive force fails to be maintained.

Similar to the case of the magnetic layer, when the non-magnetic material layer 33 has a small thickness, in some cases, the layer 33 and the noble metal layer 31 or cobalt layer 32 may be observed to have a macroscopically intermingled structure, and structural analysis reveals that the non-magnetic material layer 33 is mixed with the layer 31 or 32. In the present invention, the expression "the multi-layer structure" encompasses such a film in which the layer 33 is macroscopically mixed with the layer 31 or 32. This is because, even in such a film, microscopically, multi-layer structures formed of the noble metal layer 31 and the cobalt layer 32 are separated by the non-magnetic material layer 33, and effects of the present invention are obtained.

In each of the multi-layer structures formed of the noble metal layer 31 and the cobalt layer 32, the lowermost layer may be the noble metal layer 31 or the cobalt layer 32. However, the lowermost layer is preferably the noble metal layer 31.

In the present invention, the magnetic layer 3 is preferably a perpendicular magnetic layer in which easy-magnetization axes are oriented generally perpendicular to the substrate. As used herein, the expression "easy-magnetization axes are oriented generally perpendicular to the substrate" refers to the case where at least 50% of easy-magnetization axes (preferably at least 70% of easy-magnetization axes, more preferably at least 90% of easy-magnetization axes) are oriented perpendicular to the substrate. When the amount of easy-magnetization axes oriented perpendicular to the substrate is less than 50%, resolution is lowered. The amount of easy-magnetization axes oriented perpendicular to the substrate is measured by means of TEM or X-ray diffractometry.

In the present invention, the non-magnetic material for forming the non-magnetic material layer preferably contains, as a primary component, at least one element selected from the group consisting of C, Si, and Ge. As used herein, the term "primary component" refers to a component which is contained in the non-magnetic material in an amount (atomic %) of at least 50 at %, preferably at least 70 at %, When a plurality of elements are selected from the group consisting of C, Si, and Ge, the total amount of the elements is preferably at least 50 at %. In the present invention, the non-magnetic material preferably contains Sn.

When the non-magnetic material containing the aforementioned element in an amount of at least 50 at % is employed, noise of the resultant magnetic recording medium can be reduced.

The noble metal layer 31 preferably has a thickness of 0.4 nm to 2 nm (4 Å to 20 Å) in a single layer, more preferably 0.6 nm to 1 nm. When the thickness of the noble metal layer 31 falls outside the above range, coercive force and nucleation field (Hn) are lowered, and noise characteristics tend to deteriorate, The cobalt layer 32 preferably has a thickness of 0.1 nm to 1 nm (1 Å to 10 Å) in a single layer, more preferably 0.1 nm to 0.4 nm. When the thickness of the cobalt layer 32 falls outside the above range, coercive force and nucleation field (Hn) are lowered, and noise characteristics tend to deteriorate.

Of non-magnetic materials which may be employed in the present invention, particularly, carbon exerts remarkable effects of lowering medium noise and enhancing resolution. The non-magnetic material layer preferably has a thickness of 0.1 to 10 nm, more preferably 0.5 nm to 5 nm. When the thickness is less than 0.1 nm, the non-magnetic material layer fails to exert the effect of lowering noise, whereas when the thickness is exceeds 10 nm, spacing loss is increased by the resultant thick non-magnetic material layer.

In the present invention, the noble metal layer 31 preferably contains an oxide or nitride of a metal or a nonmetallic element, Also, the cobalt layer 32 preferably contains an oxide or nitride of a metal or a non-metallic element, or contains B. Preferred examples of the metal or non-metallic element include Cr, Cu, Ag, Au, B, Al, Ga, Si, Ge, and Zr.

In the magnetic recording medium of the present invention, preferably, the protective film 4 is formed on the magnetic layer 3. The protective film 4 is provided for preventing corrosion of the magnetic layer 3, protecting the surface of the magnetic recording medium from any damage when a magnetic head is brought into contact with the medium, and maintaining lubrication characteristics between the head and the medium. Conventionally known materials may be employed for forming the protective film 4. Examples of such materials include a single composition of C, $SiO_2$, or $ZrO_2$; and a composition containing C, $SiO_2$, or $ZrO_2$ as a primary component, and other elements.

The protective film 4 preferably has a thickness of 1 nm to 10 nm (10 Å to 100Å).

The magnetic recording medium of the present invention preferably has an Hn of 1,000 Oe to 4,500 Oe (79,000 A/m to 355,500 A/m), more preferably 1,500 Oe to 4,500 Oe (118,500 A/m to 355,500 A/m). When Hn is less than 1,000 Oe, thermal stability is lowered at low recording density, whereas when Hn exceeds 4,500 Oe, recording characteristics are deteriorated.

As used herein, Hn is defined as follows. Firstly, an external magnetic field is applied to a magnetic recording medium in a certain direction to thereby sufficiently magnetize the medium; subsequently the external magnetic field is reversed; and the intensity of the reversed magnetic field is increased. At a certain point, magnetization of the medium is reversed, and the external magnetic field at this point is defined as the nucleation field (Hn).

Figure 3:
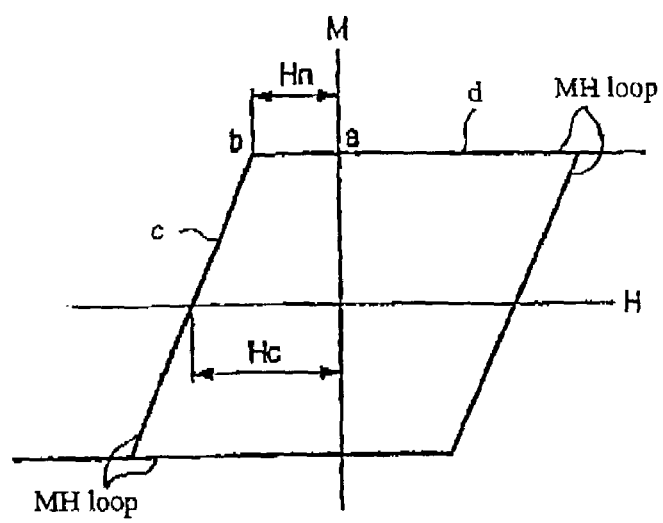
FIG. 3 is a graph for illustrating nucleation field (Hn).

Specifically, the nucleation field (Ha) is explained by use of a hysteresis loop (MH loop) shown in FIG. 3. When the aforementioned reversed magnetic field is increased, a line tangent to the MH loop at a point corresponding to the coercive force (line c) intersects with a saturation magnetization line on the MH loop and parallel to the H-axis (line d). The nucleation field (Hn, i.e. a–b) is represented by the external magnetic field at this intersection point (point b). Coercive force (Hc) is also explained by use of a MH loop shown in FIG. 3.

In the present invention, the undercoat layer 2 may be formed of a generally employed material containing a noble metal such as Pt or Pd as a primary component, but preferably, the undercoat layer 2 is formed of a material containing at least one element selected from the group consisting of C, Si, and Ge, When the undercoat layer 2 contains C, Si, or Ge as a primary component, medium noise is lowered, and coercive force is increased. The greater the thickness of the undercoat layer containing C, Si, or Ge, the lower the medium noise. The undercoat layer 2 preferably contains Sn.

The undercoat layer 2 preferably has a thickness of 20 Å to 1,000 Å. When the thickness of the undercoat layer 2 is less than 20 Å, sufficient coercive force fails to be obtained, and noise characteristics are deteriorated.

In contrast, when the thickness is exceeds 1,000 Å, the undercoat layer 2 no longer exerts effects commensurate with the increased thickness, and surface characteristics are deteriorated. When a backing layer is formed on the undercoat layer 2, i.e., when an undercoat layer of two-layer structure is formed, spacing loss of the medium is increased. From the viewpoint of noise characteristics, the thickness of the undercoat layer 2 is more preferably 100 Å to 900 Å, much more preferably 200 Å to 800 Å.

In the present invention, preferably, a soft magnetic layer is provided between the substrate 1 and the undercoat layer 2. No particular limitations are imposed on the soft magnetic layer, but preferably, the soft magnetic layer is formed of a film of a single composition of Fe, Ni, or Co; or is formed of an alloy containing Fe, Ni, or Co, and other elements.

Specific examples of materials for forming the soft magnetic layer include alloys such as NiFe, FeC, FeAlSi, CoZrNb, CoTaZr, and FeTaC.

In order to suppress spike noise generated from the soft magnetic layer, magnetic domains in the soft magnetic layer may be regulated by forming a longitudinal hard magnetic film beneath the soft magnetic layer and applying a magnetic field to the soft magnetic layer in a radial direction. Alternatively, magnetic domains in the soft magnetic layer may be regulated by addition of an antiferromagnetic material such as IrMn or PtMn thereto.

The magnetic recording medium of the present invention is produced through, for example, the following procedure: the undercoat layer 2 is formed on the substrate 1 through, for example, sputtering, and subsequently, the magnetic layer 3 is formed on the undercoat layer 2 through sputtering.

The magnetic layer 3 is formed through the following procedure: the noble metal layer 31 and the cobalt layer 32 are laminated alternately by use of a first target containing a material which constitutes the layer 31 (i.e., a material containing at least one element selected from among Pt and Pd) and a second target containing a material which constitutes the layer 32 (i.e., a material containing Co), to thereby form multi-layer structures; and the non-magnetic material layer 33 is formed by use of a third target containing a material which constitutes the layer 33 such that the layer 33 is provided between the multi-layer structures.

During the course of formation of the magnetic layer 3, preferably, the noble metal layer 31, the cobalt layer 32, and the non-magnetic material layer 33, which layers constitute the magnetic layer 3, are successively formed within a single chamber of a sputtering apparatus, the chamber having the sputtering target containing Pt or Pd, the sputtering target containing Co, and the sputtering target containing the non-magnetic material; or these targets are sputtered simultaneously through discharging within the chamber. When such a production process is employed, lamination of the layers can be performed without increasing the number of the chamber, or a single-layer film, as well as a multi-layer film, can be formed.

The undercoat layer 2 may be formed through, for example, vacuum deposition or ion plating.

Subsequently, the protective film 4 is preferably formed through plasma CVD, the ion beam method, or sputtering.

Subsequently, the lubrication film 5 is formed through, for example, dipping or spin coating.

Figure 4:
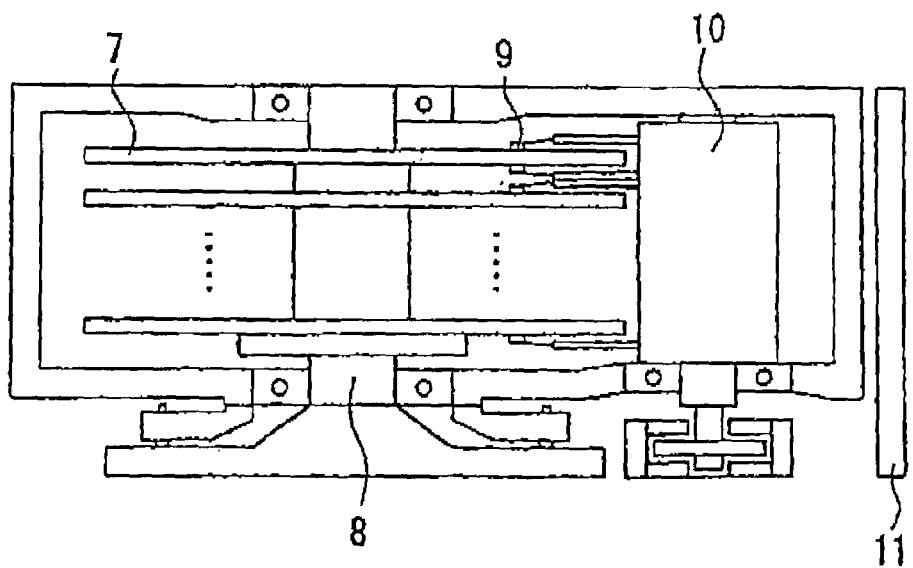
FIG. 4 is a schematic representation showing an example of a magnetic recording and reproducing apparatus incorporating the magnetic recording medium shown in FIG. 1.

FIG. 4 shows an exemplary magnetic recording and reproducing apparatus incorporating the aforementioned magnetic recording medium, The magnetic recording and reproducing apparatus shown in FIG. 4 includes a magnetic recording medium 7 of the present invention; a medium-driving section 8 which rotates the medium 7; a magnetic head 9 which is employed for recording of data onto the medium 7 and for reproduction of the data therefrom; a head-driving section 10; and a read/write-signal-processing system 11. In the read/write-signal-processing system 11, input data are processed and recording signals are sent to the magnetic head 9, or reproduction signals from the head 9 are processed and the resultant data are output.

EXAMPLES

The present invention will next be described by way of Examples, which should not be construed as limiting the invention thereto.

Example 1

A magnetic recording medium was produced through the following procedure.

A glass substrate 1 (Type: SX, product of Ohara Inc., JAPAN), which had been washed, was placed in a chamber of a DC magnetron sputtering apparatus (Model: C-3010, product of ANELVA, JAPAN).

The chamber was evacuated to $2 \times 10^{-5}$ Pa, and subsequently, a carbon undercoat layer 2 was formed on the substrate 1. Subsequently, a Pd layer (thickness of a single layer: 8 Å) and a Co layer (thickness of a single layer: 2 Å) were laminated alternately by use of a first target containing Pd and a second target containing Co. After the alternate lamination was performed 10 times, a carbon layer (i.e., a non-magnetic layer, thickness: 10 Å) was formed on the resultant multi-layer structure. Thereafter, alternate lamination of a Pd layer (thickness of a single layer: 8 Å) and a Co layer (thickness of a single layer: 2 Å) was performed 10 times, to thereby form a magnetic layer 3 comprised of two multi-layered structures and a non-magnetic material layer between the two multi-layered structures.

A protective film containing carbon (thickness 50 Å) was formed on the magnetic layer, and a lubrication film containing perfluoropolyether (thickness: 20 Å) was formed on the carbon protective film through dipping.

Examples 2 and 3

The procedure of Example 1 was repeated, except that the thickness of the non-magnetic layer was changed, to thereby produce respective magnetic recording media.

Comparative Example 1

The procedure of Example 1 was repeated, except that the non-magnetic layer was not formed, to thereby produce a magnetic recording medium.

Examples 4 and 5

The procedure of Example 1 was repeated, except that the number of the non-magnetic layer was increased, and the number of the Co layers and the Pd layers was changed, to thereby produce respective magnetic recording media.

The magnetic layer of the magnetic recording medium of Example 4 comprises a first multi-layer structure, followed by a first non-magnetic material layer, a second multi-layer structure, a second non-magnetic material layer, and a third multi-layer structure.

The magnetic layer of the magnetic recording medium of Example 5 comprises four multi-layer structures and three nonmagnetic material layers.

Examples 6 and 7

The procedure of Example 1 was repeated, except that the composition of the non-magnetic layer was changed, to thereby produce respective magnetic recording media.

Examples 8 and 9

The procedure of Example 1 was repeated, except that the composition or thickness of the undercoat layer was changed, to thereby produce respective magnetic recording media.

Example 10

The procedure of Example 9 was repeated, except that a soft magnetic layer containing CoZrNb (thickness: 2,000 Å) was formed between the substrate and the undercoat layer, to thereby produce a magnetic recording medium.

Table 1 shows production conditions employed in Examples 1 through 10 and Comparative Example 1.

Magnetostatic characteristics of each of the magnetic recording media of Examples 1 through 10 and Comparative Example 1 were measured by use of a vibrating sample magnetometer (VSM). Furthermore, read-write properties of each of the magnetic recording media were measured by use of read/write analyzer RWA1632 and spin stand S1701MP (products of GUZIK, USA). In order to evaluate read-write conversion characteristics, measurement was performed at a track-recording density of 450 kFCI by use of a complex-type thin film magnetic recording head containing a giant magnetoresistive (GMR) element at the reproduction portion.

Table 2 shows the results of the thus-measured magnetostatic characteristics and read-write properties characteristics of the magnetic recording media of Examples 1 through 10 and Comparative Example 1.

Comparison between the results of Examples 1 through 3 and Comparative Example 1 shown in Table 2 reveals that each of the magnetic recording media of Examples 1 and 2, in which the Co—Pd multi-layer structures are separated by the non-magnetic layer, exhibits excellent noise characteristics as compared with the magnetic recording medium of Comparative Example 1 having no non-magnetic layer.

The results of Examples 4 and 5 show that when the number of the Co—Pd multi-layer structures separated by the non-magnetic layers is increased, noise characteristics are further improved.

TABLE 1

| | | | Magnetic layer | | | | |
|---|---|---|---|---|---|---|---|
| | Composition of undercoat layer | Undercoat layer Thickness (Å) | [Composition thickness/composition thickness] number of laminated layers | Non-magnetic material layer | Thickness (Å) of non-magnetic material layer. | [Composition thickness/composition thickness] number of laminated layers | Non-magnetic material layer |
| Ex. 1 | Si | 1000 | [Pd 8/Co 2] 10 | C | 10 | [Pd 8/Co 2] 10 | |
| Ex. 2 | Si | 1000 | [Pd 8/Co 2] 10 | C | 50 | [Pd 8/Co 2] 10 | |
| Comp. Ex. 1 | Si | 1000 | [Pd 8/Co 2] 10 | No | — | [Pd 8/Co 2] 10 | |
| Ex. 3 | Si | 1000 | [Pd 8/Co 2] 10 | C | 150 | [Pd 8/Co 2] 10 | |
| Ex. 4 | Si | 1000 | [Pd 8/Co 2] 7 | C | 10 | [Pd 8/Co 2] 7 | C |
| Ex. 5 | Si | 1000 | [Pd 8/Co 2] 5 | C | 10 | [Pd 8/Co 2] 5 | C |
| Ex. 6 | Si | 1000 | [Pd 8/Co 2] 10 | Si | 10 | [Pd 8/Co 2] 10 | |
| Ex. 7 | Si | 1000 | [Pd 8/Co 2] 10 | Ge | 10 | [Pd 8/Co 2] 10 | |
| Ex. 8 | C | 1000 | [Pd 8/Co 2] 10 | C | 10 | [Pd 8/Co 2] 10 | |
| Ex. 9 | Si | 100 | [Pd 8/Co 2] 10 | C | 10 | [Pd 8/Co 2] 10 | |
| Ex. 10 | Si | 100 | [Pd 8/Co 2] 10 | C | 10 | [Pd 8/Co 2] 10 | |

| | Magnetic layer | | | | | |
|---|---|---|---|---|---|---|
| | Thickness (Å) of non-magnetic material layer. | [Composition thickness/composition thickness] number of laminated layers | Non-magnetic material layer | Thickness (Å) of non-magnetic material layer. | [Composition thickness/composition thickness] number of laminated layers | Total thickness (Å) of the magnetic layer |
| Ex. 1 | | | | | | 210 |
| Ex. 2 | | | | | | 250 |
| Comp. Ex. 1 | | | | | | 200 |
| Ex. 3 | | | | | | 350 |
| Ex. 4 | 10 | [Pd 8/Co 2] 7 | | | | 230 |
| Ex. 5 | 10 | [Pd 8/Co 2] 5 | C | 10 | [Pd 8/Co 2] 5 | 230 |
| Ex. 6 | | | | | | 210 |
| Ex. 7 | | | | | | 210 |
| Ex. 8 | | | | | | 210 |
| Ex. 9 | | | | | | 210 |
| Ex. 10 | | | | | | 210 |

TABLE 2

|  | Magnetostatic characteristics Hc (Oe) | Magnetostatic characteristics Hn (Oe) | Read-write properties SNR[*] (dB) |
| --- | --- | --- | --- |
| Example 1 | 4050 | 1700 | 20.5 |
| Example 2 | 3950 | 1700 | 19.6 |
| Comparative Example 1 | 6100 | 1700 | 14.5 |
| Example 3 | 3670 | 1400 | 16.2 |
| Example 4 | 3800 | 1500 | 22.9 |
| Example 5 | 3650 | 1300 | 24.8 |
| Example 6 | 4040 | 1800 | 16.5 |
| Example 7 | 4070 | 1800 | 16.2 |
| Example 8 | 4020 | 1600 | 20.3 |
| Example 9 | 3800 | 1500 | 19.2 |
| Example 10 | 3850 | 1400 | 19.5 |

[*]SNR is signal/noise ratio.

As described above, when the magnetic recording medium of the present invention is incorporated into a magnetic recording and reproducing apparatus, the resultant apparatus exhibits excellent noise characteristics.

While the invention has been described in detail and with reference to specific embodiments thereof, it will be apparent to one skilled in the art that various changes and modifications can be made therein without departing front the spirit and scope thereof.

This application is based on Japanese Patent Application No. P2002-086451 filed Mar. 26, 2002, incorporated herein by reference in its entirety.

What is claimed is:

1. A magnetic recording medium comprising a substrate, an undercoat layer, a magnetic layer, and a protective film, the undercoat layer, the magnetic layer and the protective film being provided atop the substrate,
    wherein the magnetic layer contains a plurality of multi-layer structures, each including a noble metal layer containing Pt or Pd and a cobalt containing layer, and a non-magnetic material layer containing C or Si or Ge is provided between the multi-layer structures.

2. A magnetic recording medium according to claim 1, wherein the magnetic layer contains at least three multi-layer structures each of which is separated by a non-magnetic material layer.

3. A magnetic recording medium according to claim 1, wherein, in each of the multi-layer structures, the noble metal layer and the cobalt containing layer are laminated alternately, and the noble metal layer and the cobalt layer are each provided in a number of 2 to 30.

4. A magnetic recording medium according to claim 3 wherein the number of the multi-layer structures which are separated by a non-magnetic material layer is 2 to 10.

5. A magnetic recording medium according to claim 1 or 2, wherein the magnetic layer is a perpendicular magnetic layer in which easy-magnetization axes are oriented generally perpendicular to the substrate.

6. A magnetic recording medium according to claim 1 or 2, wherein the non-magnetic material contains, as a primary component, at least one element selected from the group consisting of C, Si, and Ge.

7. A magnetic recording medium according to claim 1 or 2, wherein the non-magnetic material layer has a thickness of 0.1 nm to 10 nm.

8. A magnetic recording medium according to claim 1 or 2, wherein the noble metal layer has a thickness of 0.4 nm to 2 nm.

9. A magnetic recording medium according to claim 1 or 2, wherein the cobalt layer has a thickness of 0.1 nm to 1 nm.

10. A magnetic recording medium according to claim 1 or 2, wherein the noble metal layer contains an oxide or nitride of a metal or a non-metallic element.

11. A magnetic recording medium according to claim 1 or 2, wherein the cobalt containing layer contains an oxide or nitride of a metal or a non-metallic element.

12. A magnetic recording medium according to claim 10, wherein the metal or the non-metallic element in the oxide or nitride is at least one element selected from the group consisting of Cr, Cu, Ag, Au, B, Al, Ga, Si, Ge, and Zr.

13. A magnetic recording medium according to claim 1 or 2, which has an Hn of 1,000 Oe to 4,500 Oe (79,000 A/m to 355,500 A/m).

14. A magnetic recording medium according to claim 1 or 2, wherein the undercoat layer contains at least one element selected from the group consisting of C, Si, and Ge.

15. A magnetic recording medium according to claim 1 or 2, wherein a soft magnetic layer containing a soft magnetic material is provided between the substrate and the undercoat layer.

16. A process for producing a magnetic recording medium as recited in claim 1 or 2, characterized by comprising successively forming the noble metal layer, the cobalt containing layer, and the non-magnetic material layer, which layers constitute the magnetic layer, within a single chamber of a sputtering apparatus, the chamber having a sputtering target containing Pt or Pd, a sputtering target containing Co, and a sputtering target containing C or Si or Ge.

17. A magnetic recording medium produced through a production process as recited in claim 16.

18. A magnetic recording and reproducing apparatus comprising a magnetic recording medium as recited in claim 1 or 2.

19. A magnetic recording medium according to claim 11, wherein the metal or the non-metallic element in the oxide or nitride is at least one element selected from the group consisting of Cr, Cu, Ag, Au, B, Al, Ga, Si, Ge, and Zr.

* * * * *